United States Patent Office 2,854,354
Patented Sept. 30, 1958

2,854,354

GLASS SURFACES PROVIDED WITH STYRYL CHLORO-SILANES AND DERIVATIVES THEREOF

Howard L. Gottlieb, Madison, Wis., assignor to Bjorksten Research Laboratories, Inc., Madison, Wis., a corporation of Illinois No Drawing. Application May 11, 1953
Serial No. 354,411

5 Claims. (Cl. 117—62)

This invention relates to new and novel organo-silicon compositions and more particularly to certain derivatives of phenyl chloro silanes and laminates having incorporated therein such derivatives as reinforcing filler materials.

It has been desired to provide synthetic resin laminates having improved filler materials which would be more tightly chemically bonded to the material of this synthetic resin and which would therefore provide laminates of greater strength. It has also been desired to provide laminates having filler materials incorporated therein which would have a substantially reduced tendency to absorb water and would therefore retain their strength to a greater degree when subjected to conditions of high humidity. It has been found that the effect of the high humidity referred to may be determined to some extent by immersing the samples of laminates in boiling water for 2 hours.

According to my invention I have found that improved filler materials may be provided by preparing new and novel derivatives of phenyl chloro silanes and particularly that such derivatives may suitably be prepared by the treatment of the surfaces of articles previously with phenyl chloro silanes wherein such surface comprises available oxygen atoms.

It is therefore an object of this invention to provide superior and improved synthetic resin laminates by providing superior and improved reinforcing filler materials therefor.

Another object is a glass surface having superior adhesion for laminating synthetic resins.

It is another object to provide new and novel derivatives of phenyl chloro silane-treated oxygen-containing surfaces.

Further objects and the applicability of the invention will become apparent from the following detailed description in which it is my intention to illustrate the applicability and the scope of the invention without thereby limiting it to less than that of all equivalents.

The following examples further illustrate the invention.

EXAMPLE 1

Step 1

A bath was prepared containing a 3% solution of phenyl trichloro silane in toluene. One hundred grams of clean woven glass fabric was immersed in the bath for 5 minutes at room temperature. The fabric was then removed, washed with water, and dried thoroughly in an oven at 70° C. (It may be air-dried at room temperature.)

Diphenyl dichloro silane has been used in place of phenyl trichloro silane. Suitable results have been obtained with 2 to 15% of either of these compounds in toluene. Triphenyl monochloro silane has been applied to glass cloth successfully in a 5% solution in toluene.

The fabric thus treated was cooled to 0° C. or a lower temperature and immersed in a solution of mixed nitrating acid such as: 2 parts nitric acid and 1 part sulfuric acid or 1 part nitric acid and 1 part sulfuric acid or a solution of fuming nitric acid or a solution of red fuming nitric acid. The cloth was allowed to remain in this solution for 5 minutes.

A time of 1 minute was successful for glass fabric treated with triphenyl monochlorosilane; the longest suitable time was 20 minutes, and the longest preferable time about 10 minutes.

Various proportions of nitric and sulfuric acids have been used from 2:1 to 1:2 and acetic acid has been used with nitric acid in approximately the same ranges. Sulfuric acid is preferred because it causes less deterioration of the silane treated surface. Temperature during nitration should preferably be held below 10° C. and better results are obtained with lower temperatures. The preferable temperature is −10° to 0.

After thus being nitrated the treated fabric is washed to free it from nitric acid.

Laminates of cloth treated in these several manners were prepared with an epoxy resin, that is, a resin having the formula:

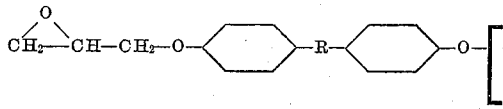 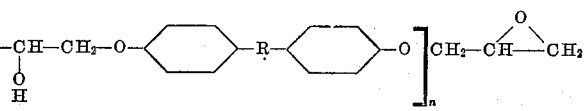

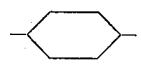

wherein R may be —O— or $$-\overset{Y}{\underset{Y}{C}}-$$

where Y is $C_xH_{2x+1}$ and x is 1 to 6 and is bis-phenyl which may be halogen substituted.

A suitable reinforced resin sheet was thus produced.

Step 2

Glass fabric samples treated with phenyltrichlorosilane and diphenyldichlorosilane in accordance with Step 1 were treated to substitute —CH₂Cl groups on the phenyl ring in the following manner.

A sample of glass cloth treated in accordance with Step 1 was wetted thoroughly with methylal $(CH_3O)_2CH_2$, which had previously been cooled to a temperature below 0° C. The glass cloth was preferably not cooled previously but might be so cooled. To catalyze the reaction of the methylal with the phenyl radical, aluminum chloride was sometimes suspended in the cooled anhydrous methylal.

Glass cloth treated in this manner was quickly placed in a desiccator, being laid out flat on a screen of copper or aluminum gauze which served as a catalyst for the subsequent reaction. An atmosphere of HCl gas was produced by dripping sulfuric acid onto sodium chloride contained in the lower part of the desiccator below the glass cloth. The reaction was further catalyzed by depositing a layer of anhydrous aluminum chloride on the surface of the fabric. The reaction with HCl and the catalyst was allowed to proceed for from 3 hours to about 48 hours at room temperature; generally about 24 hours was felt preferable. It is of course obvious that any other means of providing a dry gaseous HCl atmosphere would be suitable such as for example, placing the cloth in a chamber provided with such an atmosphere from a cylinder of HCl gas or by any other suitable means.

As mentioned above, aluminum chloride to catalyze the reaction was in some instances applied to the cloth by being suspended in the methylal rather than being applied during the application of dry HCl gas and in some cases aluminum chloride was applied in both manners.

Step 3

The fabric thus chloromethylated was washed with water to remove excess reactants and catalyst and was then oxidized to replace the chloromethyl groups with —CHO groups. Two methods were used.

METHOD 1

The fabric was immersed in a 10% solution of lead nitrate in a solvent composed of 1 part ethanol and 4 parts water. In some instances copper nitrate was used in place of lead nitrate but lead nitrate was found preferable and in some cases water alone was used as a solvent, ethyl alcohol being omitted. Either ethyl or methyl alcohol is suitable or for that matter any lower aliphatic alcohol and it is clear that the alcohol may be omitted since the solvent is not critical. This reaction was allowed to continue at room temperature for from about ½ hour to 6 hours; generally about 2 to 4 hours was found to be preferable, shorter times being inadequate to complete the reaction and longer times being useless to substantially carry the reaction further.

Other suitable means of oxidation may be used: in a few instances for example, chlorine in the chloromethyl group was replaced by bromine and thus the reaction was photobromination; this reaction was carried out by the application of gaseous bromine vapor under a bright light which of course may be any suitable means for applying light rays in the visible and the ultra violet spectrum but sunlight was used. Samples which had thus been brominated to replace the chlorine and hydrogen of the chloromethyl groups with bromine and thus provide glass having bromomethyl groups (—CBr$_3$, —CBr$_2$H, or —CBrH$_2$)

attached to the surface thereof may be laminated with various synthetic resins. It would obviously of course be possible to produce, similarly, a fabric having available —CCl$_3$ groups by chlorination of the chloromethyl derivative. The resulting bromomethyl group was then hydrolyzed with hot water to oxidize and thus produce both aldehyde and acid groups attached to the phenyl radical. This proved to be a quite satisfactory method for providing the phenyl radical with —COOH radicals attached thereto. The samples of glass cloth treated in this manner, that is those in which acid groups were provided attached to phenyl groups and phenyl chloro silanes such as particularly phenyltrichlorosilane and diphenyl dichlorosilane attached to the surface of glass, were incorporated as reinforcing filler material in ⅛ inch thick laminated resin plates utilizing the following synthetic resins:

Epoxy _____ Epon 1001
Melamine-formaldehyde _____ Melmac 405

In some instances dilute nitric acid, specifically 10% nitric acid, was added to the oxidizing solution comprising lead nitrate or copper nitrate to enhance the effectiveness of the reaction. A permanganate oxidation of the chloromethyl group to convert it to an aldehyde or acid group might also be used but it was felt that it would be difficult to remove the MnO$_2$ which would be deposited upon the glass fabric in the course of this reaction.

Glass fabric provided in a similar manner with —COOH groups attached to the surface thereof by being attached to the phenyl radicals attached to silicon atoms attached to oxygen atoms at the glass surface may also be provided by modifications of other methods of providing —COOH groups on an aromatic ring which are not deleterious to the surface. The primary considerations in preventing degradation of the treated surface are to avoid highly acidic conditions or highly alkaline conditions and to avoid high temperatures such as temperatures above about 90° C. Another method of oxidizing is direct oxidation with oxygen at high pressure of the methyl group in the tolyl radical of tolyltrichloro silane applied to a glass surface. Another method is oxidation of the tolyl radical with permanganate.

METHOD 2

The chloromethyl groups provided on the phenyl radical in accordance with Method 1 were also converted to aldehydic groups by use of the Sommelet reaction in the following manner:

Glass fabric prepared in accordance with Method 1 and thereby having chloromethyl groups attached through phenyl radicals and silicon atoms to oxygen atoms at the surface of the glass was washed and then immersed in a solution of 20% hexamethylene tetramine and aqueous ethyl alcohol. The concentration may be as high as 40% or as low as 10% but generally best results were obtained with about 20%. The reaction was allowed to take place at room temperature for 2 to 5½ hours, and occasionally for as long as 24 hours. About 3 to 6 hours was generally found preferable. It is believed that by this reaction a quaternary ammonium salt is formed.

The product of the reaction was then washed thoroughly with hot water. The resulting product had —CHO radicals attached to the phenyl group.

The fabrics prepared in accordance with this example, that is those in which aldehydic groups were provided attached to the phenyl radicals of phenylchlorosilanes attached to glass, were incorporated as a reinforcement in ⅛ inch thick plates of resin laminates using the following resins:

Epoxy _____ Epon 1001
Phenyl-formaldehyde _____ Bakelite BV17085
Melamine-formaldehyde _____ Melmac 405

The presence of the aldehyde group was determined by the silver mirror test and also by the iodine test.

Step 4

The aldehyde derivative of phenyl trichloro silane-treated glass was prepared in accordance with Step 3.

This was then reacted with acetone and alkali to carry out a Claisen-Schmidt condensation in the following manner:

100 grams of glass fabric provided with aldehyde groups on phenyl silane groups attached to the surface was immersed at room temperature in acetone (200 grams) containing 2.0 grams of sodium hydroxide. The reaction was allowed to proceed at room temperature for 20 hours. The alkali served as a catalyst. During the course of the reaction the acetone largely evaporated. The reaction in another instance was carried out for only 4 hours and equivalent results were achieved.

The sample was removed from the acetone bath, washed thoroughly with water and dried.

It is believed that the benzalacetone derivative was thus formed, with the radical having the formula:

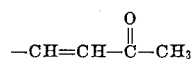

being attached to phenyl rings attached to the glass surface through silicon atoms.

Step 5

The derivative thus prepared was subjected to hypohalite oxidation with an alkali metal hypochlorite in the following manner:

The glass sample prepared as above was immersed in a 5% aqueous solution of sodium hypochlorite and allowed to stand at room temperature for from 20 minutes to 2 hours. It was found that the shorter time produced results substantially as good as those produced with the longer time.

The derivative wherein the following radical:

—CH$_2$=CH—COOH was attached to the phenyl radical was thus produced.

*Step 6*

Two methods were used to decarboxylate and thereby prepare the styryl (vinyl phenyl) derivative.

METHOD 1

The glass cloth samples were heated to temperatures between 200° C. and 300° C. at which temperatures carbon dioxide was evolved. Best results were obtained at temperatures between 270° C. and 300° C. although suitable results were obtained with temperatures as low as 200° C. and as high as 340° C.

METHOD 2

The cinnamic acid derivative prepared as described above was treated with quinoline in the following manner:

Copper filings were brushed onto and into the surface of the samples of treated glass fabric, prepared as above, and the samples thus containing and covered with copper filings were immersed in quinoline. The reaction mixture was warmed to the refluxing temperature of quinoline and then cooled down to room temperature again.

The quinoline was then removed by repeated washing with dilute acid solutions and with water.

It was found difficult to remove the quinoline and the results obtained were not altogether as good as those obtained with Method 1.

By these methods, glass cloth was prepared having styryl i. e. (vinyl phenyl) groups attached to the glass surface through silicon atoms.

The glass fabric samples treated as described above and containing vinyl radicals attached to the phenyl radical, that is, containing styryl radicals, attached to the glass surface through silicon atoms, were incorporated as reinforcing filling materials in synthetic resin laminates prepared in the form of sample plates ⅛ inch thick, in which the following resins were utilized:

Epoxide resin (Epon 1001)
Phenol formaldehyde resin (Bakelite BV71085)
Melamine formaldehyde resin (Melmac 405)
Polyester resin (Laminac 4128)
Polyester resin (Selectron 5003)
Silicone resin (Dow 2104)

The flexural strengths and tensile strengths of the laminates thus prepared exhibited great improvements over similar laminates prepared with untreated glass fabric, the strength values obtained being in some cases approximately almost twice as great as those obtained with the laminates reinforced with untreated fabric after being immersed in boiling water for two hours.

EXAMPLE 2

The nitro styryl derivative was prepared by nitrating the phenyl aldehydic derivative according to Step 1 above so that glass fabric was prepared having both nitro groups and aldehyde groups available, attached to phenyl radicals attached to the glass surface through silicon atoms.

Glass cloth treated in this manner was then treated to convert the aldehyde group to the benzalacetone group and thence to the cinnamic acid group as described above and to then convert the cinnamic acid group to the vinyl group, using Methods 1 and 2.

Glass cloth samples treated in this manner, in which nitro styryl radicals were attached to the glass surface through silicon atoms, were laminated as reinforcing filler materials in ⅛ inch thick sample laminate plates with the following synthetic resins:

Epoxy resins (Epon 1001)
Phenol formaldehyde resins (BV17085)

Superior properties similar to those of the laminates described in Example 1, were observed. Similar results may be obtained with melamine formaldehyde resins, polyester resins and silicone resins and other resins commonly used in preparing laminated articles.

EXAMPLE 3

I may also prepare by the methods described above together with methods for reduction, oxidation, sulfonation and halogenation, glass fabric having the following groups attached through silicon atoms to the glass surface -amino styryl
-hydroxy styryl
-halo styryl such as -chloro styryl, that is -chloro vinyl phenyl and -bromo styryl.

Suitable methods for such reduction, oxidation and halogenation are described in co-pending application Serial No. 332,516 filed January 21, 1953, now abandoned.

The examples have disclosed only certain methods for carrying out the reactions in order to produce various above described functional groups attached to the glass surface in such manner as to be available for further reaction with such other compounds as synthetic resin with which the glass fabric may be laminated. It will be understood that other suitable methods of providing these same groups on the surface may be utilized in accordance with the invention and some of these methods have been mentioned hereinabove.

Although only woven glass fabrics have been mentioned hereinabove and only such fabrics were utilized in the examples, it is obvious that the invention would be equally applicable to layers of parallel glass fibers laminated in synthetic resins such as are disclosed in co-pending application 317,072 filed October 27, 1952, now abandoned.

The above examples have shown the preparation of glass fibers provided at the surface thereof with certain chemical radicals and groups attached thereto, wherein silicon atoms are bonded to the glass surface and other groups are attached to said silicon atoms. The nature of the bond between the silicon atoms and the glass surface is not clearly understood at this time. It is believed probable that the silicon atoms are attached to oxygen atoms at and in the surface of the glass and it may be theorized that these oxygen atoms to which the silicon atoms are bonded are part of the silicon-oxygen lattice structure of the glass. However, because it is known that at most glass surfaces there is a layer which may be several molecules or several hundred molecules deep, of adsorbed $H_2O$ and that $H_2O$ molecules are found at depths of perhaps as much as 1/32 of an inch below the surface of the glass, it seems almost equally possible that silicon atoms of the phenyltrichlorosilane derivatives of the invention are attached to oxygen atoms of an $H_2O$ structure which is adsorbed on the surface of the glass and thus the silicon atoms might be described as being bonded to the glass surface thru oxygen atoms and thence thru hydrogen atoms. I thus prefer not to commit myself specifically as to the nature of the atoms at the surface of the glass to which said silicon atoms are attached and in the following formulae, which describe the products produced according to the invention, I have chosen to utilize the word "glass" to represent the glass surface to which said silicon atoms are attached.

It will be understood that while the above examples have disclosed the preparation of compounds attached to glass surfaces which may be described as styryl trichloro silyl glass and, by hydrolysis of this compound, styryl siloxyl glass, distyryl dichloro silyl glass and distyryl siloxyl glass, tristyryl monochloro silyl glass and tristyryl siloxyl glass, in a similar manner I may produce, according to the invention, styryl siloxane, distyryl siloxane and tristyryl siloxane. Thus the invention relates to compounds having the following formula:

$$R_1-\underset{\underset{R_2}{|}}{\overset{\overset{R_2}{|}}{Si}}-glass$$

wherein $R_1$ is styryl (which may be substituted or unsubstituted) and $R_2$ is —$R_1$ or —Cl or $$-OH \text{ or } -O-\underset{\underset{glass}{|}}{\overset{\overset{R_1}{|}}{Si}}-R_2$$

In the event the styryl radical is substituted, one or more of the same or different functional groups may be attached to the benzene ring of the styryl radical. Such substitution may consist of one to four groups attached to the benzene ring and these groups may include one or more, but of course no more than four, of the following:

| | |
|---|---|
| —$NO_2$ | —$CH_2Br$ |
| —$NH_2$ | —$CHBr_2$ |
| —CHO | —$CBr_3$ |
| —COOH | —Cl |
| —$CH_2Cl$ | —Br |
| —$CHCl_2$ | —$SO_3H$ |
| —$CCl_3$ | —$COCH_3$ |
| —CHBrCl | —OH |
| —$CBr_2Cl$ | —N≡N |
| —$CBrCl_2$ | | and therefore the invention relates to glass having bonded to the surface thereof through reactive oxygen atoms at said surface a plurality of radicals of the formula:

$$R_2-\underset{|}{\overset{\overset{R_1}{|}}{Si}}-R_2$$

wherein $R_1$ is selected from the group consisting of unsubstituted styryl and styryl having attached to the benzene ring thereof one to four chemically reactive substituent groups containing at most 6 atoms and $R_2$ is —$R_1$ or —Cl or —OH or $$-O-\underset{\underset{\text{(said surface)}}{|}}{\overset{\overset{R_1}{|}}{Si}}-R_2$$

bonded to said surface similarly.

Although the use only of glass fibers has been described for utilization, it is obvious that according to my invention glass in such forms as plates, sheets, beads and particles may equally well be used and the invention is in no way limited to glass fibers or glass fabric in particular since the treatment works equally well with glass in any form.

It has furthermore been found that the invention is not limited to glass but may in fact be applied to any material having on the surface available oxygen groups for linking to the silicon atom of halo silanes as illustrated by the following examples.

A sheet of paper toweling or a block of wood may be provided with styryl trichloro silane groups attached to the surface in accordance with the method described above. Laminates can suitably be prepared with paper and other cellulosic materials treated in this manner. It is obvious that substituent groups on the phenyl radical can be prepared in the same manner as described hereinabove in connection with glass surfaces.

Therefore the invention also relates to compounds having the following further generalized formula:

$$R_1-\underset{\underset{R_2}{|}}{\overset{\overset{R_2}{|}}{Si}}-\text{substance having surface reactive oxygen atoms}$$

wherein $R_1$ is styryl (which may be substituted or unsubstituted) containing at most 6 atoms and $R_2$ is —$R_1$ or —Cl or —OH or $$-O-\underset{\underset{\text{substance having surface reactive oxygen atoms}}{|}}{\overset{\overset{R_1}{|}}{Si}}-R_2$$

EXAMPLE 4

Each of the reactions described in previous examples was carried out with either glass rods or glass cylinders as well as being carried out with glass fibers.

It may be seen that the invention relates broadly to a substance having reactive oxygen atoms at the surface thereof having bonded to the surface thereof through said oxygen atoms a plurality of radicals of the formula:

$$R_2-\underset{|}{\overset{\overset{R_1}{|}}{Si}}-R_2$$

wherein $R_1$ is selected from the group consisting of unsubstituted styryl and styryl having attached to the benzene ring thereof one to four chemically reactive substituent groups containing at most 6 atoms and $R_2$ is —$R_1$ or —Cl or —OH or $$-O-\underset{\underset{\text{(said surface)}}{|}}{\overset{\overset{R_1}{|}}{Si}}-R_2$$

bonded to said surface similarly.

I do not know specifically the actual arrangement of the vinyl group on the benzene ring or of substituted functional groups on the benzene ring. For example the vinyl group may be para to the silicon atom or may be ortho or meta thereto; when two groups are substituted they may be ortho and para respectively to the silicon atom or they may both be meta to the silicon atom, etc. Thus in the several formulae set forth hereinabove and in the claims, no symbol should be taken as indicating a particular location of a vinyl group or of any other group on a benzene ring and with this in mind the formulae have been so drawn as to attempt to indicate that the vinyl group and the substituent groups may be at any suitable place on the ring.

Thus it may be observed that my invention is broad in scope and is to be restricted only by the claims.

Having thus disclosed my invention, I claim:

1. In a process for providing a substituted phenyl chloro silane group on a glass surface including the treating of a phenyl silane to substitute groups on at least some of the phenyl radicals in said silane, the improvement which comprises applying unsubstituted phenyl chloro silane to the glass surface prior to said treating operation.

2. In a process for providing a substituted phenyl chloro silane group on a glass surface including the treating of a phenyl silane to substitute groups on at least some of the phenyl radicals in said silane, the improvement which comprises applying unsubstituted phenyl chloro silane to the glass surface prior to said treating operation in which said applying includes washing and drying of the glass surface.

3. The process of claim 1 wherein said treating operation includes treating with mixed nitric and sulfuric acids in a ratio of from 2:1 to 1:2 parts by weight for one minute to twenty minutes at a temperature below 10° C. to introduce nitro groups on the phenyl radicals.

4. The process of claim 1 wherein said treating operation includes treating with mixed nitric and sulfuric acids in a ratio of from 2:1 to 1:2 parts by weight for one minute to twenty minutes at a temperature below 10° C. to introduce nitro groups on the phenyl radicals and then reducing the nitro groups thus introduced to amine groups.

5. The process of claim 1 wherein said treating operation includes chloromethylating said phenyl radicals to provide chloromethyl groups thereon, converting said chloromethyl groups to aldehydic groups, oxidizing and decarboxylating to provide vinyl groups attached to the phenyl radicals.

References Cited in the file of this patent

UNITED STATES PATENTS

| | | |
|---|---|---|
| 2,258,219 | Rochow | Oct. 7, 1941 |
| 2,386,452 | Fleming | Oct. 9, 1945 |
| 2,413,582 | Rust et al. | Dec. 31, 1946 |
| 2,469,154 | Bunnell et al. | May 3, 1949 |
| 2,563,288 | Steinman | Aug. 7, 1951 |
| 2,742,378 | Te Grotenhuis | Apr. 17, 1956 |

OTHER REFERENCES

Benkeser: "J. Am. Chem. Soc.," vol. 76, 1954, pages 904 and 905.

UNITED STATES PATENT OFFICE
CERTIFICATE OF CORRECTION

Patent No. 2,854,354                          September 30, 1958

Howard L. Gottlieb

It is hereby certified that error appears in the printed specification of the above numbered patent requiring correction and that the said Letters Patent should read as corrected below.

Column 1, line 42, after "previously" insert -- provided --.

Signed and sealed this 30th day of December 1958.

(SEAL)

Attest:
KARL H. AXLINE

Attesting Officer

ROBERT C. WATSON
Commissioner of Patents